US008855394B2

(12) United States Patent
Yang et al.

(10) Patent No.: US 8,855,394 B2
(45) Date of Patent: Oct. 7, 2014

(54) METHODS AND APPARATUS FOR TEXTURE BASED FILTER FUSION FOR CBCT SYSTEM AND CONE-BEAM IMAGE RECONSTRUCTION

(75) Inventors: Dong Yang, Pittsford, NY (US); Robert A. Senn, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 125 days.

(21) Appl. No.: 13/537,205

(22) Filed: Jun. 29, 2012

(65) Prior Publication Data

US 2013/0004041 A1    Jan. 3, 2013

Related U.S. Application Data

(60) Provisional application No. 61/503,630, filed on Jul. 1, 2011.

(51) Int. Cl.
G06K 9/40         (2006.01)
G06T 11/00        (2006.01)

(52) U.S. Cl.
CPC ............... G06K 9/40 (2013.01); G06T 11/003 (2013.01)
USPC .................................................. 382/131

(58) Field of Classification Search
None
See application file for complete search history.

(56) References Cited

U.S. PATENT DOCUMENTS 5,270,926 A   12/1993  Tam
5,999,587 A   12/1999  Ning et al.
2003/0076988 A1*  4/2003  Liang et al. .................... 382/131
2005/0046644 A1*  3/2005  Ohishi ........................... 345/643
2005/0180541 A1*  8/2005  Avinash et al. .................... 378/5
2005/0228272 A1* 10/2005  Yu ................................. 600/425
2005/0259889 A1* 11/2005  Ferrari et al. ................. 382/275
2008/0144904 A1*  6/2008  Wiegert et al. ............... 382/131
2008/0165920 A1*  7/2008  De Man et al. ................. 378/17
2008/0187195 A1*  8/2008  Kohler et al. ................. 382/128
2009/0086883 A1*  4/2009  Harer et al. ..................... 378/4
2009/0087070 A1*  4/2009  Slabaugh et al. ............. 382/132
2009/0169086 A1*  7/2009  Thoms .......................... 382/132
2009/0290779 A1* 11/2009  Knapp et al. ................. 382/132
2010/0067772 A1*  3/2010  Kitamura ...................... 382/132

(Continued)

OTHER PUBLICATIONS

Dong Yang ; Ruola Ning ; Xiaohua Zhang ; Ricardo Betancourt ; Shaohua Liu; Image quality improvement based on wavelet regularization for cone beam breast CT (CBBCT). Proc. SPIE 7259, Medical Imaging 2009: Image Processing, 725929 (Mar. 27, 2009).*

(Continued)

*Primary Examiner* — Atiba O Fitzpatrick
*Assistant Examiner* — Thomas A James

(57) ABSTRACT

Embodiments of methods and/or apparatus for 3-D volume image reconstruction of a subject, executed at least in part on a computer for use with a digital radiographic apparatus can obtain a 3D volume reconstruction or projection image by generating a first-filtered set of projection images from a plurality of 2-D projection images taken over a range of scan angles and a different second-filtered set of projection images from the plurality of 2-D projection images. Then, for example, a first 3-D volume image of the subject from the first-filtered set of projection images and a second 3-D volume image of the subject from the second-filtered set of projection images can be combined using different weighting combinations in at least two corresponding portions to generate the 3-D volume image of the subject.

20 Claims, 16 Drawing Sheets

(56) References Cited

U.S. PATENT DOCUMENTS

| | | |
|---|---|---|
| 2010/0073522 A1* | 3/2010 | Siddiqui et al. ............... 348/241 |
| 2011/0002523 A1* | 1/2011 | Prakash et al. ................ 382/131 |
| 2011/0228899 A1* | 9/2011 | Funk et al. ........................ 378/9 |
| 2011/0286651 A1* | 11/2011 | Yu et al. ......................... 382/131 |
| 2012/0008845 A1* | 1/2012 | Ning et al. ..................... 382/131 |
| 2012/0015316 A1* | 1/2012 | Sachdeva et al. ............... 433/24 |
| 2012/0155734 A1* | 6/2012 | Barratt et al. ................. 382/131 |
| 2013/0202177 A1* | 8/2013 | Bar-Aviv et al. .............. 382/131 |
| 2013/0216113 A1* | 8/2013 | O'Connor ..................... 382/128 |

OTHER PUBLICATIONS

Ming Zhang; Gunturk, B., "A new image denoising method based on the bilateral filter," Acoustics, Speech and Signal Processing, 2008. ICASSP 2008. IEEE International Conference on , vol., No., pp. 929-932, Mar. 31, 2008-Apr. 4, 2008.*

* cited by examiner

CORONAL IMAGE OF KNEE CADAVER USING EMBODIMENT OF
FUSION PROCESS FROM BENCH SYSTEM WITH TOTAL OF 115 mAs

SAGITTAL IMAGE OF KNEE CADAVER USING EMBODIMENT OF
FUSION PROCESS FROM BENCH SYSTEM WITH TOTAL OF 115 mAs

METHODS AND APPARATUS FOR TEXTURE BASED FILTER FUSION FOR CBCT SYSTEM AND CONE-BEAM IMAGE RECONSTRUCTION

CROSS REFERENCE TO RELATED APPLICATIONS

This application claims the benefit of U.S. Provisional Application No. 61/503,630, filed Jul. 1, 2011, entitled METHODS AND APPARATUS FOR TEXTURE BASED FILTER FUSION FOR CBCT SYSTEM AND CONE-BEAM IMAGE RECONSTRUCTION, which is hereby incorporated by reference in its entirety.

FIELD OF THE INVENTION

Embodiments described herein relate generally to radiation-based imaging. More particularly, the described embodiments relate to methods and/or apparatus for texture based filter fusion for volume imaging. Exemplary embodiments relate to the field of digital radiography, diagnostic imaging and more particularly to Cone-Beam Computed Tomography (CBCT) imaging. More specifically, the application relates to methods and apparatus for volume imaging, for example using projection data of CBCT image content.

BACKGROUND OF THE INVENTION

3D X-ray flat panel detector based cone beam imaging CT system provides an unprecedented advantage for high spatial resolution display of the 3D volume data due to its 3D isotropic spatial resolution. However, since the increase of the X-ray coverage along the rotation axis, the scatter correspondingly increases resulting in the decrease of the low contrast resolution as well as the non-uniformity artifacts across the reconstructed cross sectional image view. The use of the grid decreases of the primary X-ray beam intensity, which results in the noise increase in the reconstructed image. Furthermore, after the software based scatter correction which is usually conducted through the subtraction of the estimated scatter distribution 2D data from the corresponding original projection data in the linear space, the uniformity gets better at the cost of higher noise in the reconstructed image domain. That's why for the soft tissue, the CBCT can not provide comparable contrast to noise ratio (CNR) to conventional fan beam CT or multi-slice CT due to the higher scattering and less X-ray dose level.

SUMMARY OF THE INVENTION

Accordingly, it is an aspect of this application to address in whole or in part, at least the foregoing and other deficiencies in the related art.

It is another aspect of this application to provide in whole or in part, at least the advantages described herein.

Another aspect of this application is to provide methods and/or systems that can address volume DR image reconstruction processing such as CBCT volume DR image reconstruction.

These objects are given only by way of illustrative example, and such objects may be exemplary of one or more embodiments of the application.

Other desirable objectives and advantages inherently achieved by the disclosed embodiments or combinations thereof may occur or become apparent to those skilled in the art. The invention is defined by the appended claims.

According to one embodiment of the invention, there is provided a method for digital radiographic 3D volume image reconstruction of a subject, executed at least in part on a computer, that can include obtaining image data for a plurality of 2-D projection images over a range of scan angles; processing the plurality of noise-corrected projection images to reconstruct a 3-D volume image of the subject by: generating a first-filtered set of projection images from the plurality of 2-D projection images and a different second-filtered set of projection images from the plurality of 2-D projection images; reconstructing a first 3-D volume image of the subject from the first-filtered set of projection images and a second 3-D volume image of the subject from the second-filtered set of projection images; segmenting at least one of the first 3-D volume image of the subject and the second 3-D volume image of the subject to generate a mask, and combining the first 3-D volume image of the subject and the second 3-D volume image based on the mask to generate the 3-D volume image of the subject; and displaying a projection image from the 3-D volume image of the subject.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DESCRIPTION OF EXEMPLARY EMBODIMENTS

Figure 1:
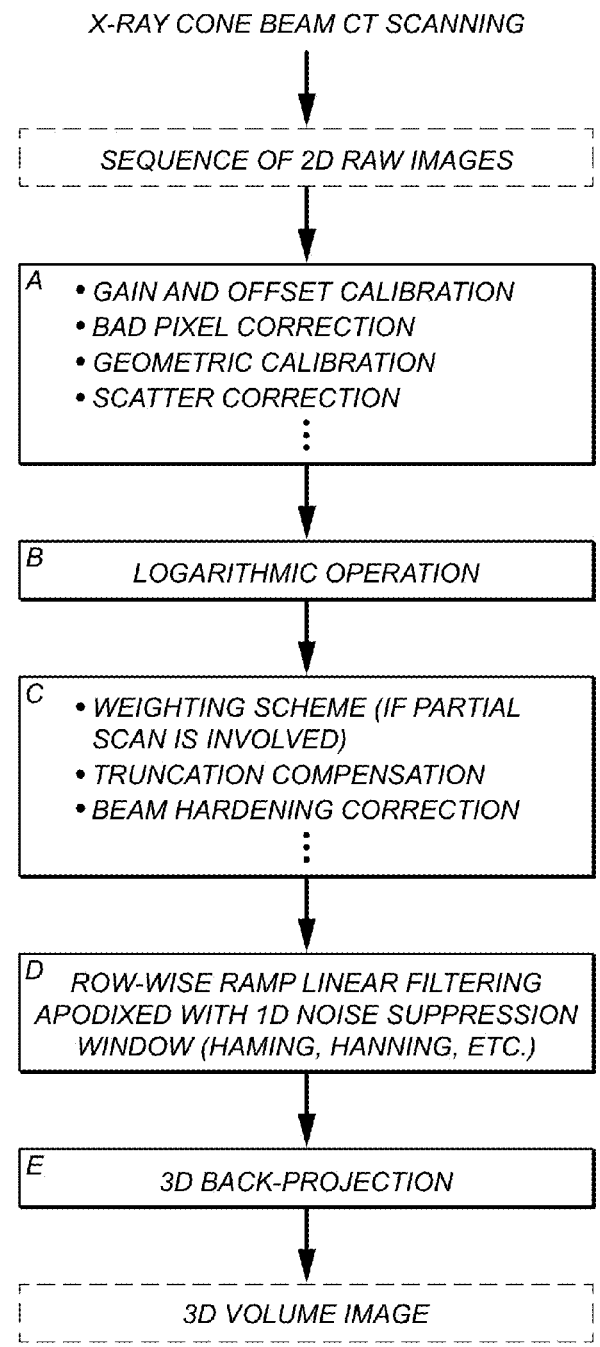
FIG. 1 is a logic flow diagram showing the sequence of processes used for conventional CBCT volume image reconstruction.

The following is a description of exemplary embodiments according to the application, reference being made to the drawings in which the same reference numerals identify the same elements of structure in each of the several figures, and similar descriptions concerning components and arrangement or interaction of components already described are omitted. Where they are used, the terms "first", "second", and so on, do not necessarily denote any ordinal or priority relation, but may simply be used to more clearly distinguish one element from another.

In the context of the present disclosure, the term "code value" refers to the value that is associated with each volume image data element or voxel in the reconstructed 3-D volume image. The code values for CT images are often, but not always, expressed in Hounsfield units (HU).

CBCT imaging apparatus and imaging algorithms used to obtain 3-D volume images using such systems are well known in the diagnostic imaging art and are, therefore, not described in detail in the present application. Some exemplary algorithms for forming 3-D volume images from the source 2-D images, projection images that are obtained in operation of the CBCT imaging apparatus can be found, for example, in U.S. Pat. No. 5,999,587 entitled "Method of and System for Cone-Beam Tomography Reconstruction" to Ning et al. and in U.S. Pat. No. 5,270,926 entitled "Method and Apparatus for Reconstructing a Three-Dimensional Computerized Tomography (CT) Image of an Object from Incomplete Cone Beam Data" to Tam.

Through cadaver study on bench top CBCT system, related art CBCT can provide much better detailed information than conventional CT inside of the bone structures, but the contrast-to-noise ratio (CNR) in the soft tissue is much inferior to what can be achieved through conventional CT.

Before describing processing to increase CNR in soft tissue for CBCT according to certain exemplary embodiments, let's take a look at the related art reconstruction process associated with the CBCT system embodiments described herein. The related art reconstruction process basically follows the cascaded imaging chain that is illustrated in FIG. 1. As can be seen from the flow chart, the denoising action is conducted at the fourth stage represented by label D, and is a one dimensional row wise noise suppression window regularized on top of the ramp linear filtering inherited in the FDK algorithm before back-projection. So far, based on the operation following the imaging chain illustrated in FIG. 1, the best contrast to noise ratio that can be achieved is through the Hann window regularization.

FIG. 1 is a logic flow diagram showing the sequence of processes used for conventional CBCT volume image reconstruction. As shown in FIG. 1, only 1D row-wise filtering is conducted, which makes the noise suppression very inefficient by not using the adjacent 2D neighboring pixels for denoising. Furthermore, the fall-off of the Hanning window at the high frequency part reduces the contrast of the useful signal as well as suppresses the useful information at high frequency part.

Figure 2:
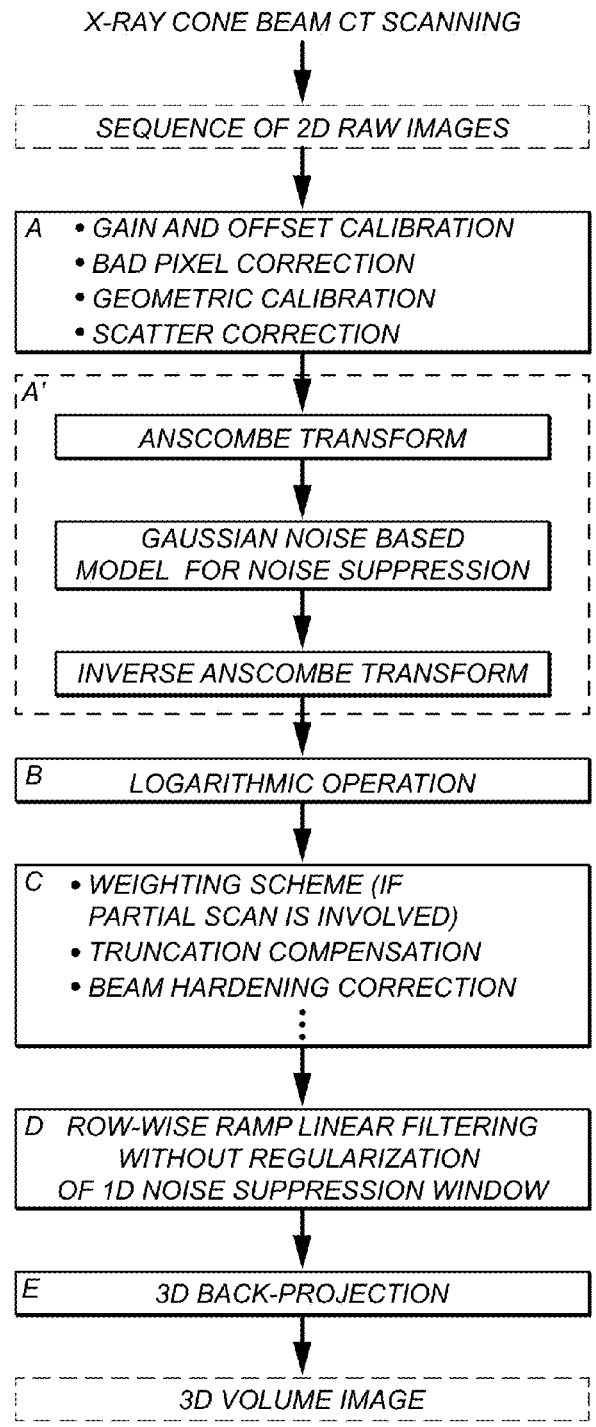
FIG. 2 is a logic flow diagram showing the sequence of processes used for related art CBCT volume image reconstruction.

FIG. 2 is a logic flow diagram showing the sequence of processes used for related art CBCT volume image reconstruction. The modified imaging chain for CBCT system conducts denoising in the Anscombe transformed linear space, as is illustrated in FIG. 2.

Certain exemplary embodiments described herein can modify the imaging processes described in FIGS. 1-2 for improved performance (e.g., noise suppression, better CNR, etc.). Certain exemplary embodiments can modify processes such as the block labeled as A' to do the noise suppression. Further, in block labeled as D, ramp linear can be conducted without being apodized with any window in order to maintain (e.g., more, as much as possible, etc.) detailed information, especially within the bone structure and/or to get higher contrast than through related art way of noise suppression, this can be very important for soft tissue visualization.

Certain exemplary embodiments described herein are system, apparatus and/or methods for using the same that can provide a novel fusion reconstruction based on the respective bone and soft tissue filtering (e.g., at least two types of filtering) where noise suppression can be conducted in the Anscombe domain as shown in FIG. 2.

In one embodiment, a hybrid filtering process can be used for what can be called bone structure and soft tissue reconstruction. For example, a bilateral filter and a Wavelet shrinkage filter were cascaded to conduct exemplary hybrid filtering. Bilateral filter applies spatial weighted averaging without smoothing edges, which can be achieved by combining two Gaussian filters; one filter works in spatial domain and the other works in intensity domain. It is very effective in removing high-frequency noise. Wavelet denoising by Wavelet coefficient thresholding can be a denoising method among those related art methods, such as Wiener filter, anisotropic filter, total variation and non-local mean filters. One benefit or advantage of the Wavelet transformation is the inherent capability to capture not only the different frequency components present in the image but also their spatial localization of occurrence, using variable size of windows for different frequency bands, which can result in a high frequency resolution in low bands and low frequency resolution in high bands that can allow the capability to treat different frequency components of an image separately. Thus, the Wavelet filter can be beneficial since noise in real scenario described herein can be frequency dependent.

The order of one exemplary cascaded hybrid filtering is bilateral→Wavelet thresholding→bilateral. Bilateral filter can be initially used to pre-suppress the high frequency noise in the image; at the second stage, Wavelet thresholding can be classified into bone and soft tissue filtering by manipulating the decomposition of Wavelet transformation; bilateral can be used again to remove the residual noise in high frequency. Another rationale using hybrid filtering is the realization that either of the multiple filters has corresponding strength and/or weakness and multiple filters can be kind of complimentary to each other. After the filtration through bone and soft tissue filters, certain exemplary embodiments can be given two (e.g., multiple) sets of projection, bone set and soft tissue set. Following the exemplary related art process labeled as B, C, D, E in FIG. 2, two sets of reconstruction data are preferably generated. The final reconstruction image can be fused by weighted combination of these two sets of data. Segmentation is used or required in the reconstruction domain to separate bone and soft tissue for fusion.

Parameters associated with exemplary hybrid filters (e.g., noise level estimate) or the like (e.g., two filters) can be properly adjusted within their efficient range to generate the selected, improved or optimal images in terms of noise level and/or spatial resolution that using either of such individual filters alone or other filters can never achieve the same level of image quality in the reconstruction domain.

Bone Filtering

As described herein, one difference or the only difference between exemplary bone filter and soft tissue filter can be at the second stage where the Wavelet transformation can be classified into bone and soft tissue filtering (e.g., to respectively generate bone and soft tissue projection images). In one embodiment, only one level wavelet decomposition is adopted for bone filter and the thresholding can be conducted only at the higher frequency band.

Soft Tissue Filtering

In soft tissue thresholding in the wavelet domain, two level wavelet decomposition can be adopted and thresholding is conducted at both higher and medium low frequency bands.

Fusion

In one exemplary embodiment, morphological operation combined with thresholding can be used to segment the bones from the bone filtered reconstructed images. Fusion can then be conducted based on the bone mask, where for example, for the bone part, more weight is put on bone filtered reconstructed image and for the soft tissue part, more weight is put on soft tissue filtered reconstructed image.

Scanning Protocol

Certain exemplary embodiments for denoising fusion protocol according to the application were applied extemporary cadaver data such as on the cadaver knee data acquired from bench CBCT system equipped with the anti-scatter grid. Two data sets were used where one data set has exposure level of 0.1 mAs per frame and the other data set has 0.25 mAs per frame, but both data sets are reconstructed using partial scan with angular coverage of 230 degrees and with 460 projections. The accumulated mAs for both cases are: 46 mAs and 115 mAs, which is about one fourth and less than half of the dose level currently used by conventional CT for knee imaging. However, embodiments of the application are not intended to be so limited to either the subjects for imaging, exposure levels, scan angles or the like.

Data and Results

In the following exemplary results, projection images in log space as well as the reconstruction image in three orientations are displayed for comparison among cases that include: without denoising, Hanning window apodized filtering and exemplary embodiments of hybrid filtering fusion. As shown here, fusion is only conducted in the reconstruction domain.

Figure 3A:
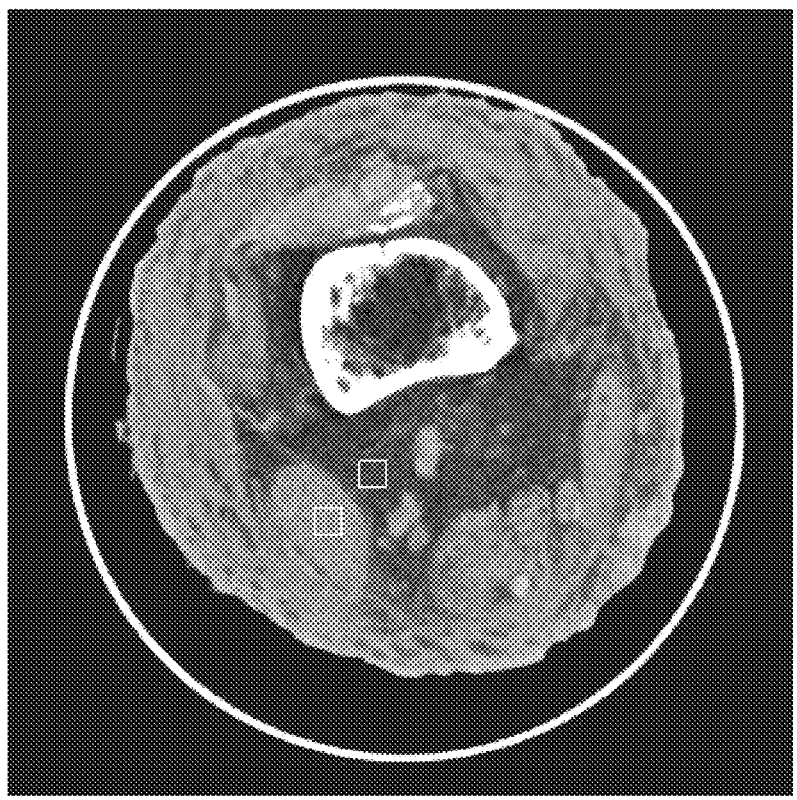
FIGS. 3A-3E are diagrams that show exemplary axial images with different noise suppression/image reconstruction.
Figure 3B:
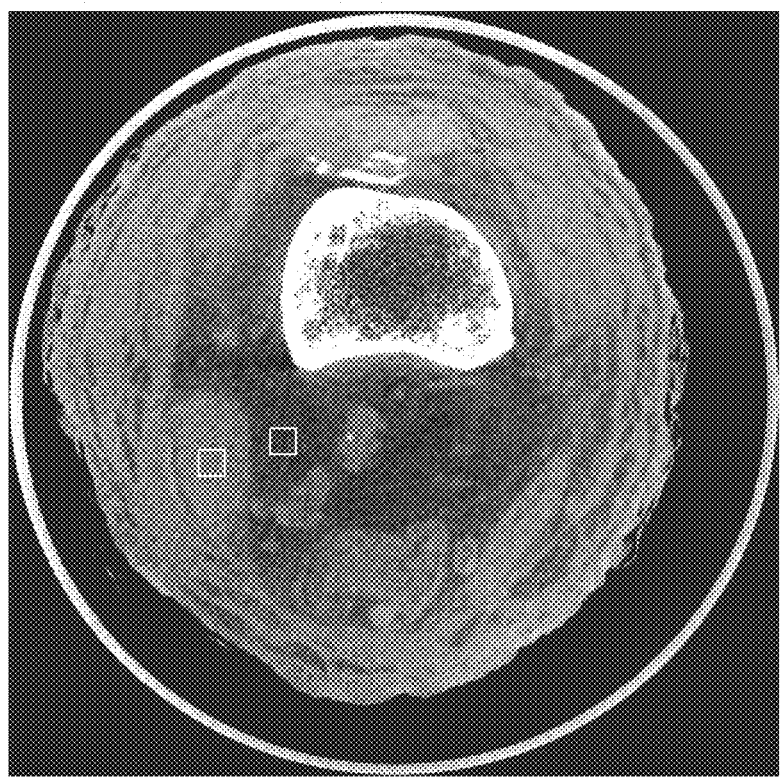
Figure 3C:
Figure 3D:
Figure 3E:

FIGS. 3A-3E are diagrams that show exemplary cross sectional (axial) images of different noise suppression/image reconstructions. As shown in FIGS. 3A-3E, cross sectional image comparison are for the same window of [−150 300] set for display. FIG. 3A is a diagram that shows knee cadaver axial image from conventional CT with total of 217 mAs. FIG. 3B is a diagram that shows axial image of knee cadaver using an embodiment of denoising fusion from bench system with total of 115 mAs. FIG. 3C is a diagram that shows Hanning denoising based axial image of knee cadaver from bench system with total of 115 mAs. FIG. 3D is a diagram that shows cross image of knee cadaver using an embodiment of denoising fusion from bench system with total of 46 mAs. FIG. 3E is a diagram that shows Hanning denoising based cross image of knee cadaver from bench system with total of 46 mAs.

Figure 3F:
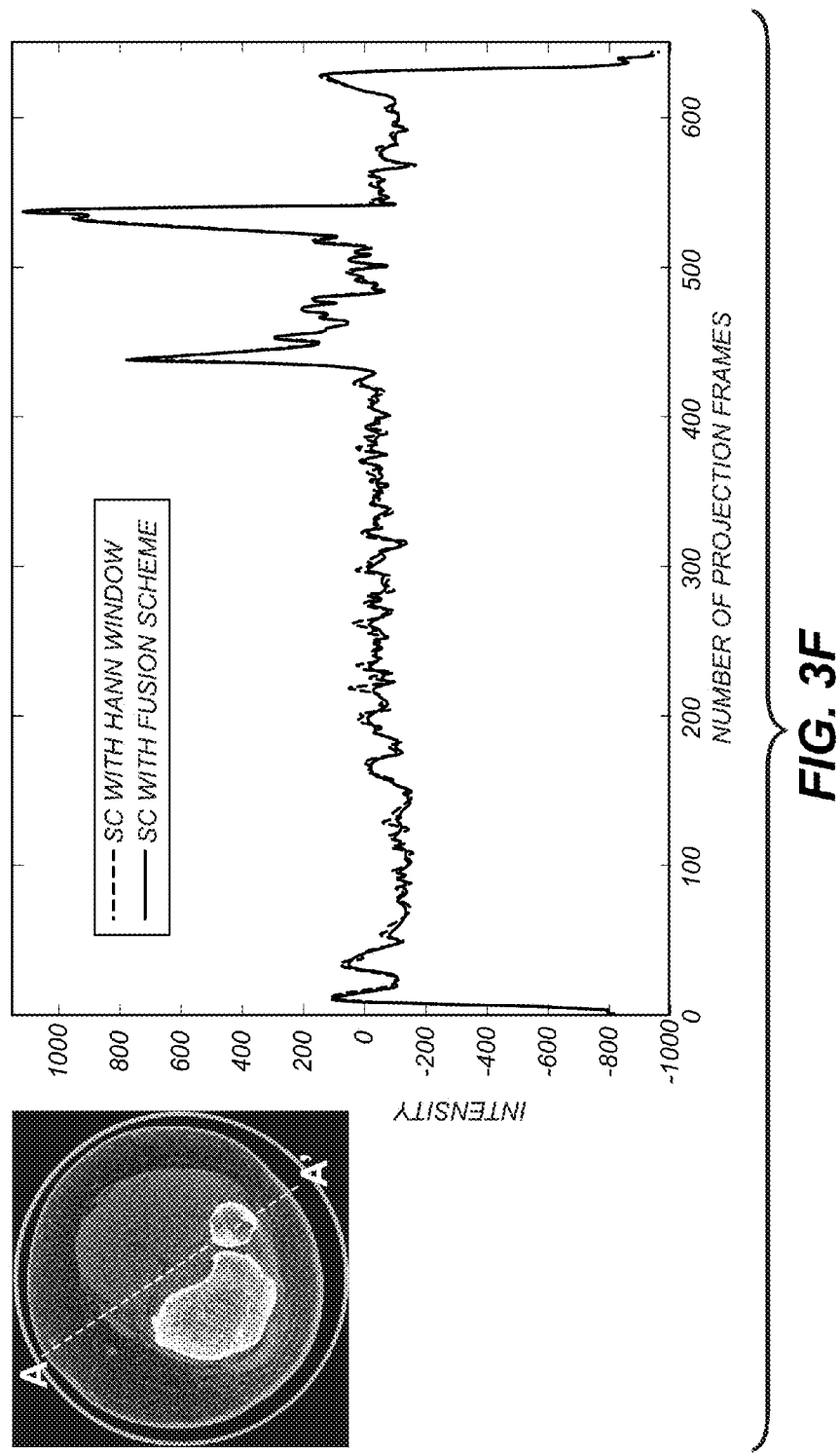
FIG. 3F is a diagram that shows image profile comparisons along the line A-A' shown for one exemplary fusion scheme embodiment vice one related art scatter correction.

FIG. 3F is a diagram that shows image profile comparisons along the line A-A' shown for one exemplary fusion scheme embodiment vice one related art scatter correction.

Figure 4A:
FIGS. 4A-4F are diagrams that show exemplary coronal and sagittal image comparison, respectively, for a consistent display.
Figure 4B:
Figure 4C:
Figure 4D:
Figure 4E:
Figure 4F:

FIGS. 4A-4F are diagrams that show exemplary coronal and sagittal image comparison, respectively for the same window of [−150 300] set for display. FIG. 4A is a diagram that shows ramp linear based coronal image of knee cadaver from bench system with total of 115 mAs. FIG. 4B is a diagram that shows Hanning denoising based coronal image of knee cadaver from bench system with total of 115 mAs. FIG. 4C is a diagram that shows coronal image of knee cadaver using embodiment of fusion process from bench system with total of 115 mAs. FIG. 4D is a diagram that shows ramp linear based sagittal image of knee cadaver from bench system with total of 115 mAs. FIG. 4E is a diagram that shows Hanning denoising based sagittal image of knee cadaver from bench system with total of 115 mAs. FIG. 4F is a diagram that shows 4F sagittal image of knee cadaver using embodiment of fusion process from bench system with total of 115 mAs.

Visually, reconstructions based on filtered fusion embodiments can achieve a significant improvement over those based on related art Hanning denoising method. Such exemplary improvements are visually shown in images in FIG. 3A through FIG. 4F, where the soft tissue behaves much smoother while the boundary details are well maintained. Furthermore, some of the tiny soft tissue structures are well differentiated in the image reconstructed through filtered fusion embodiments, while they are either vaguely seen or not seen due to the noise present in the image reconstructed through related art methods. The trabecular bony structures inside of the bones are well kept using filtered fusion embodiments compared to the ramp linear filtered reconstruction and the noise inside of the bones are largely reduced through bone filter. To get an approximate quantitative measurement on how much improvement in terms of the contrast to noise ratio achieved through fusion reconstruction embodiments, two square boxes are placed in the cross sectional images coming from different scanners and different reconstruction schemes on the same scanner. As is shown in FIG. 3, one box (18 by 18) is placed in the soft tissue and the other same size box is placed in the background. The results are summarized in Table 1 below.

TABLE 1

Approximate Contrast to noise ratio comparison based on cross images

| | | Signal | | Background | | | | CNR |
|---|---|---|---|---|---|---|---|---|
| | | S_mean (CT #) | Standard deviation (S_std) | B_mean (CT #) | Standard deviation (B_std) | Contrast (S_mean − B_mean) | Noise Level (S_std + B_std)/2 | Contrast/ Noise level |
| Conventional CT scanning (217 mAs) | | 46 | 8.07 | −91 | 10.51 | 137 | 9.29 | 14.75 |
| Bench system (115 mAs) | Hanning denoising | −13 | 29.01 | −115 | 28.76 | 102 | 28.89 | 3.53 |
| | Hybrid fusion | −14 | 11.82 | −117 | 12.71 | 103 | 12.27 | 8.40 |
| Bench system (46 mAs) | Hanning denoising | 4 | 46.03 | −99 | 51.37 | 103 | 48.7 | 2.11 |
| | Hybrid fusion | 3 | 21.19 | −99 | 23.26 | 102 | 22.23 | 4.59 |

The result is significant since under each mAs level, the CNR improvement is more than 100 percent. Notice that the CNR from the conventional CT with mAs level of 217 is 14.75. When the mAs is halved, a simple calculation by multiplying the previous CNR by $1/\sqrt{2}$ gives new CNR of 10.4, which is about 20 percent higher than what is achieved on CBCT bench with similar mAs level. Considering the scattering associated with the CBCT, this level of CNR achieved through fusion scheme is very encouraging. Also notice that the CNR achieved in fusion scheme under mAs level of 46 is 30 percent higher than that of reconstructed through Hanning denoising based scheme under mAs level of 115. One can visually compare the image between FIG. 3C and FIG. 3D.

Through the knee cadaver data, novel bone and soft tissue filtering-based fusion embodiments proved its efficacy either visually and/or approximate quantitative measurement in terms of CNR. Since the object being imaged is simple, the robustness of the segmentation of bone can be effectively guaranteed. Further, by combining the ART iterative reconstruction with exemplary embodiments described herein, reconstructed image quality can be further improved by correcting some of the artifacts caused by streaking, metal and non-uniform angular sampling.

Figure 5:
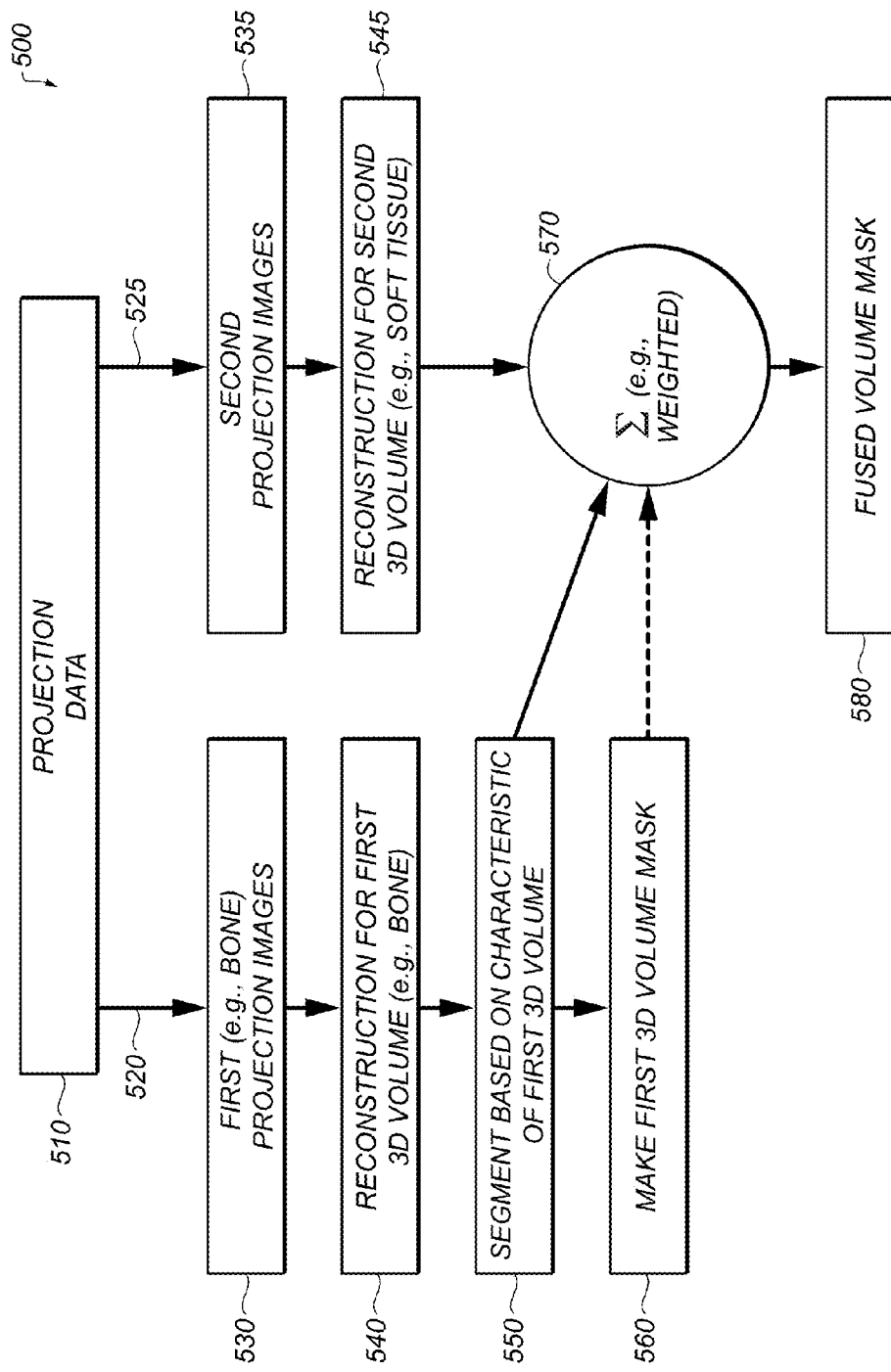
FIG. 5 is a flowchart showing an embodiment of a method for cone-beam computed tomography 3-D volume image reconstruction of a subject according to the application.

Referring to the logic flow diagram of FIG. 5, there is shown an image processing sequence 500 according to an embodiment of the application. As shown in FIG. 5, a process can begin with receiving or obtaining a plurality of projection images (e.g., 2D projection data, from a CT scan or the like) in operation block 510. Thus, in one embodiment, processes up to step A described earlier for the conventional sequence of FIG. 2 can be used prior to operation block 510. From operation block 510, a first filtering process or first predefined filter can be applied to the plurality of projection images to generate a first plurality of projection images based on the plurality of projection images (operation block 520). Further, a second filtering process or second predefined filter can be applied to the plurality of projection images to generate a second plurality of projection images based on the plurality of projection images (operation block 525). In one embodiment, the first filter can be a combined filter or hybrid filter such as a bilateral, wavelet, bilateral filter combination. However, other filters or combinations of filters can be used for the first filter. In one embodiment, the second filter can be a combined filter or hybrid filter such as a bilateral, wavelet filter combination. However, other filters or combinations of filters can be used for the second filter. Various filters have been described in the related art to generate a selected characteristic for a prescribed plurality of projection images based on the plurality of projection images.

Then, the first plurality of projection images can be processed through a known reconstruction process to generate a first set of reconstruction data and a first 3D volume can be determined using the first set of reconstruction data (operation block 540). In one exemplary embodiment, the first plurality of projection images can use the process labeled as B, C, D, E described earlier for the related art sequence of FIG. 2 for operation block 540. Similarly, the second plurality of projection images can be processed through a known reconstruction process to generate a second set of reconstruction data and a second 3D volume can be determined (operation block 545). In one exemplary embodiment, the second first plurality of projection images can use the process labeled as B, C, D, E described earlier for the related art sequence of FIG. 2 for operation block 545.

Then, at least one of the first 3D volume and the second 3D volume can be segmented. As shown in FIG. 5, the first 3D volume can be segmented using a prescribed characteristic. For example, the first 3D volume can be segmented to identify bone portions or to segment bone portions out of the first 3D volume (operation block 550). The segmentation determined in operation block 550 can be used to generate a first mask (e.g., volume mask) (operation block 560). In one exemplary embodiment, based on the first mask, a weighted combination of the first 3D volume and the second 3D volume (operation block 570) can be used to determine a fused 3D volume or third combined 3D volume (operation block 580), which can include an increased CNR. For example, in images identified by the first mask a first weighted combination of the first 3D volume and the second 3D volume can be used and in other portions not identified by the first mask a second combination of the first 3D volume and the second 3D volume can be used to determine the fused volume.

The combined 3D volume of operation block 580 can be stored (e.g., in a computer readable medium), transmitted to a remote location or displayed for visual review.

Exemplary embodiments of the application can provide filtering to a first characteristic in the first plurality of projection images (e.g., small details in bone images) and filtering to a different characteristic in the second plurality of projection images (e.g., decrease noise in the soft tissue images and/or data) so that a fused or combined volume can have an improved CNR. Further, exemplary embodiments of the application can use low dose or lower dose of radiation (e.g., x-ray radiation) while still providing clinically acceptable diagnostic images and/or volumes for medical diagnostic use.

In typical applications, a computer or other type of dedicated logic processor for obtaining, processing, and storing image data is part of the CBCT system, along with one or more displays for viewing image results. A computer-accessible memory is also provided, which may be a non-volatile memory storage device used for longer term storage, such as a device using magnetic, optical, or other data storage media. In addition, the computer-accessible memory can comprise an electronic memory such as a random access memory (RAM) that is used as volatile memory for shorter term data storage, such as memory used as a workspace for operating upon data or used in conjunction with a display device for temporarily storing image content as a display buffer, or memory that is employed to store a computer program having instructions for controlling one or more computers to practice methods and/or system embodiments according to the present application.

Figure 6:
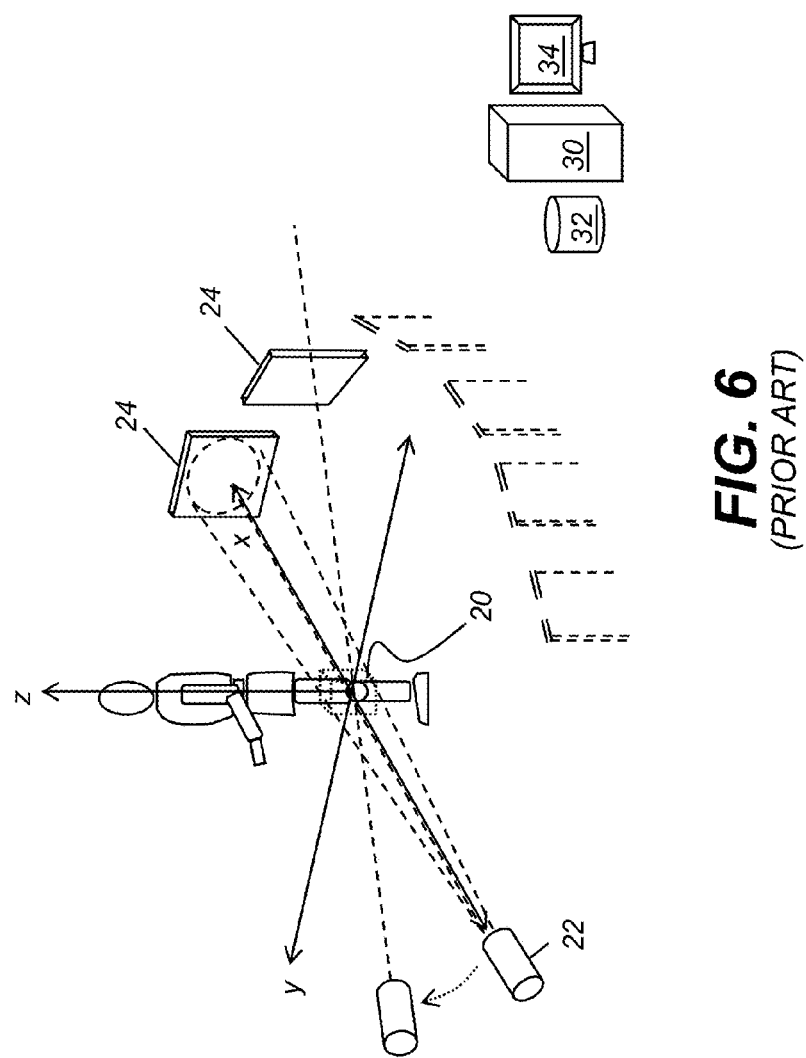
FIG. 6 is a schematic diagram showing components and architecture used for conventional CBCT scanning.

To understand exemplary methods and/or apparatus embodiments according to the present application and problems addressed by embodiments, it is instructive to review principles and terminology used for CBCT image capture and reconstruction. Referring to the perspective view of FIG. 6, there is shown, in schematic form and using exaggerated distances for clarity of description, the activity of an exemplary conventional CBCT imaging apparatus for obtaining the individual 2-D images that are used to form a 3-D volume image. A cone-beam radiation source 22 directs a cone of radiation toward a subject 20, such as a patient or other imaged subject. A sequence of images of subject 20 is obtained in rapid succession at varying angles about the subject over a range of scan angles, such as one image at each 1-degree angle increment in a 200-degree orbit. A DR detector 24 is moved to different imaging positions about subject 20 in concert with corresponding movement of radiation source 22. For example, such corresponding movement can have a prescribed 2D or 3D relationship. FIG. 6 shows a representative sampling of DR detector 24 positions to illustrate how these images are obtained relative to the position of subject 20. Once the needed 2-D projection images are captured in a prescribed sequence, a suitable imaging algorithm, such as FDK filtered back projection or other conventional technique, can be used for generating the 3-D volume image. Image acquisition and program execution are performed by a computer 30 or by a networked group of computers 30 that are in image data communication with DR detectors 24. Image processing and storage is performed using a computer-accessible memory in image data communication with DR detectors 24 such as computer-accessible memory 32. The 3-D volume image or exemplary 2-D image data can be presented on a display 34.

Certain exemplary hybrid filtering process embodiments using bone and soft tissue texture filters conducted in the transformed linear space can provide more flexible denoising effects than related art methods while the ramp linear filter can be maintained during back-projection to improve the contrast. The significant improvement of contrast to noise ratio (CNR) in the soft tissue for hybrid filtering process is achieved over related art Hann windows based reconstruction; while also the bony structures from bone filtered reconstruction can behave shaper and/or have less noise. In one embodiment, hybrid filtering process embodiments can use segmentation conducted on the cross sectional image reconstructed from the bone filtered projection data. Further, validation of hybrid filtering process for denoising has been conducted on data acquired when anti-scatter grid was employed with similar observed improvements.

In addition, while a particular feature of an embodiment has been disclosed with respect to only one of several implementations or embodiments, such feature can be combined with one or more other features of the other implementations and/or other exemplary embodiments as can be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "exemplary" indicates the description is used as an example, rather than implying that it is an ideal.

The invention has been described in detail with particular reference to exemplary embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for digital radiographic 3-D volume image processing of a subject, the method executed at least in part on a computer, the method comprising:
   obtaining a plurality of 2-D digital projection images, the plurality of 2-D digital projection images exposed over a range of scan angles;
   filtering the plurality of 2-D digital projection images using a first combination of filters to generate a first set of filtered projection images;
   filtering the plurality of 2-D digital projection images using a second combination of filters to generate a second set of filtered projection images, wherein the first combination of filters are different from the second combination of filters and wherein the plurality of 2-D digital projection images that are filtered by the first combination and the second combination of filters are the same 2-D digital projection images;
   reconstructing a first 3-D volume image of the subject from the first set of filtered projection images and reconstructing a second 3-D volume image of the subject from the second set of filtered projection images;
   segmenting the first 3-D volume image of the subject to generate a mask;
      combining the first 3-D volume image of the subject and the second 3-D volume image of the subject based on the mask to generate a final 3-D volume image of the subject; and
   displaying a cross sectional slice from the final 3-D volume image of the subject.

2. The method of claim 1, further comprising electronically storing the final 3-D volume image of the subject, where the 3-D volume image has an increased contrast-to-noise ratio.

3. The method of claim 2, further comprising correcting image data in the 3-D volume image for noise.

4. The method of claim 1, wherein the step of filtering the plurality of 2-D digital projection images using the first combination of filters comprises a first bilateral filtering followed by wavelet filtering followed by a second bilateral filtering.

5. The method of claim 4, wherein the step of filtering the plurality of 2-D digital projection images using the second combination of filters comprises bilateral filtering followed by wavelet filtering.

6. The method of claim 2, further comprising storing the final 3-D volume image of the subject in a computer-accessible memory.

7. The method of claim 1, wherein obtaining the 2-D digital projection images comprises obtaining image data from a cone-beam computerized tomography apparatus.

8. The method of claim 1, further comprising correcting image data in the plurality of 2-D digital projection images using an Anscombe transform.

9. A method for cone-beam computed tomography 3-D volume image reconstruction of a subject, the method executed at least in part on a computer, the method comprising:
   obtaining a plurality of 2-D digital projection images, the plurality of 2-D digital projection images exposed over a range of scan angles using cone-beam computed tomography;
   filtering the plurality of 2-D digital projection images using a first combination of filters to generate a first set of filtered projection images;
   filtering the plurality of 2-D digital projection images using a second combination of filters to generate a second set of filtered projection images, wherein the first combination of filters are different from the second combination of filters and wherein the plurality of 2-D digital projection images that are filtered by the first combination and the second combination of filters are the same 2-D digital projection images;
   reconstructing a first 3-D volume image of the subject from the first set of filtered projection images and reconstructing a second 3-D volume image of the subject from the second set of filtered projection images;
   segmenting the first 3-D volume image of the subject to generate a mask;
      combining the first 3-D volume image of the subject and the second 3-D volume image of the subject based on the mask to generate a final 3-D volume image of the subject; and
   storing a cross sectional slice from the final 3-D volume image of the subject.

10. The method of claim 9, further comprising displaying the final 3-D volume image of the subject or transmitting the final 3-D volume image of the subject to an external location.

11. The method of claim 9 where the subject is a limb, an extremity, a weight bearing extremity or a portion of a dental arch.

12. The method of claim 9, wherein the final 3-D volume image of the subject comprises an orthopedic medical image, a dental medical image, a pediatric medical image or an image generated by image data from a flat panel detector.

13. The method of claim 9, further comprising:
performing one or more of geometric correction, scatter correction, beam-hardening correction, and gain and offset correction on the plurality of 2-D digital projection images;
performing a logarithmic operation on the plurality of 2-D digital projection images to obtain line integral data; and
performing a row-wise ramp linear filtering to the line integral data.

14. The method of claim 9, further comprising processing the plurality of 2-D digital projection images according to a variance-stabilizing transform to provide transformed image data and performing a row-wise ramp linear filtering to the plurality of 2-D digital projection images without regularization of a noise suppression window.

15. The method of claim 9, further comprising performing one or more of geometric correction, scatter correction, beam-hardening correction, and gain and offset correction on the obtained plurality of 2-D digital projection images.

16. The method of claim 9, further comprising using an anti-scatter grid in the cone-beam computed tomography.

17. A computer implemented method of processing digital radiographic images of a subject, the method comprising:
obtaining a plurality of 2-D digital projection images of the subject;
filtering the plurality of 2-D digital projection images of the subject using a first combination of filters to generate a first set of filtered projection images;
filtering the plurality of 2-D digital projection images of the subject using a second combination of filters to generate a second set of filtered projection images, wherein the first combination of filters are different from the second combination of filters and wherein the plurality of 2-D digital projection images that are filtered by the first combination and the second combination of filters are the same 2-D digital projection images;
reconstructing a first 3-D volume image of the subject using the first set of filtered projection images and reconstructing a second 3-D volume image of the subject using the second set of filtered projection images; and
combining the first 3-D volume image of the subject and the second 3-D volume image of the subject to generate a final 3-D volume image of the subject.

18. The computer implemented method of claim 17, wherein the step of combining comprises weighting image data from the first 3-D volume image of the subject and summing the weighted image data from the first 3-D volume image of the subject with image data from the second 3-D volume image of the subject.

19. The computer implemented method of claim 18, wherein the step of filtering the 2-D digital projection images using the first combination of filters comprises selecting filters for optimizing bone imaging in the first 3-D volume image of the subject.

20. The computer implemented method of claim 19, wherein the step of filtering the 2-D digital projection images using the second combination of filters comprises selecting filters for optimizing soft tissue imaging in the second 3-D volume image of the subject.

* * * * *